(12) United States Patent
Schreiber et al.

(10) Patent No.: US 6,732,618 B1
(45) Date of Patent: May 11, 2004

(54) MACHINE TOOL (75) Inventors: Leo Schreiber, Schwäbisch-Gmünd (DE); Otmar Ritz, Birenbach (DE); Anton Horsky, Wangen (DE)

(73) Assignee: Boehringer Werkzeugmaschinen GmbH, Goppingen (DE)

( * ) Notice: Subject to any disclaimer, the term of this patent is extended or adjusted under 35 U.S.C. 154(b) by 0 days.

(21) Appl. No.: 09/936,744

(22) PCT Filed: Mar. 15, 2000

(86) PCT No.: PCT/EP00/02309

§ 371 (c)(1),
(2), (4) Date: Nov. 9, 2001

(87) PCT Pub. No.: WO00/54929

PCT Pub. Date: Sep. 21, 2000

(30) Foreign Application Priority Data

Mar. 15, 1999 (DE) .......................... 199 11 411

(51) Int. Cl.⁷ .............................. B23B 3/00; B23B 17/00
(52) U.S. Cl. ............................ 82/149; 82/117
(58) Field of Search .......................... 82/117, 120, 121, 82/901, 149; 409/134

(56) References Cited

U.S. PATENT DOCUMENTS

| | | | |
|---|---|---|---|
| 2,329,357 A | 9/1943 | Mowery, Jr. et al. ............ 143/6 |
| 3,650,166 A | 3/1972 | Schmid .......................... 82/32 |
| 3,680,413 A * | 8/1972 | Hiney .......................... 82/124 |
| 3,785,227 A | 1/1974 | Wolff .............................. 82/2 |
| 4,070,934 A | 1/1978 | Sladdin et al. ................. 82/2 R |
| 4,177,701 A * | 12/1979 | Schulz ........................ 82/164 |
| 4,187,601 A * | 2/1980 | Aldrin .......................... 29/560 |
| 4,478,117 A | 10/1984 | Brown et al. ................... 82/32 |
| 4,657,455 A | 4/1987 | Rogers et al. ............. 409/235 |
| 4,685,361 A * | 8/1987 | Myers .......................... 82/117 |
| 4,840,095 A * | 6/1989 | Nussbaumer et al. ......... 82/117 |
| 4,852,434 A * | 8/1989 | Bald ............................ 82/118 |
| 4,950,113 A * | 8/1990 | Winkler et al. ............. 409/134 |
| 5,127,140 A * | 7/1992 | Oiwa et al. ................. 29/27 C |
| 5,282,300 A * | 2/1994 | Girny et al. ................ 29/27 C |
| 5,293,793 A * | 3/1994 | Hessbruggen et al. ........ 82/121 |
| 5,415,610 A * | 5/1995 | Schutz et al. ................. 483/16 |
| 5,429,020 A * | 7/1995 | Hack et al. .................... 82/117 |
| 5,439,431 A * | 8/1995 | Hessbruggen et al. ........ 483/14 |
| 5,820,098 A * | 10/1998 | Miyano ....................... 248/637 |
| 6,446,397 B1 * | 9/2002 | O'Connor et al. ............. 52/64 |
| 2002/0066342 A1 * | 6/2002 | Baumann et al. ............. 82/117 |

FOREIGN PATENT DOCUMENTS

| | | |
|---|---|---|
| CH | 417275 A | 7/1966 |
| DE | 644182 C | 4/1937 |
| DE | 3002104 A1 | 7/1981 |
| DE | 3207076 A1 | 9/1983 |
| DE | 3309324 A | 9/1984 |
| DE | 3626929 A | 2/1988 |
| DE | 4229423 A1 | 3/1994 |
| DE | 4441252 A | 5/1996 |
| EP | 0032642 A1 | 7/1981 |

(List continued on next page.)

OTHER PUBLICATIONS

Japanese Patent Abstract 08099302, Published Apr. 16, 1996.

*Primary Examiner*—A. L. Wellington
*Assistant Examiner*—Brian D. Walsh
(74) *Attorney, Agent, or Firm*—Head, Johnson & Kachigian (57) ABSTRACT

The invention concerns a machine tool which, in spite of the possibility of being simple and inexpensive to produce, permits a highly variable design configuration and fitment of the machine tool with machine modules and moreover in spite of good chip removal permits a simple energy supply with little susceptibility to trouble, in particular for the lower machine modules. A machine tool according to the invention comprising a bed on which are arranged guides for carrying machine modules is characterized in that the bed is a portal bed which is stood up on at least one bed foot.

52 Claims, 5 Drawing Sheets

FOREIGN PATENT DOCUMENTS

| | | |
|---|---|---|
| EP | 0093800 A2 | 11/1983 |
| GB | 639267 A | 6/1950 |
| GB | 2106438 A | 4/1983 |
| WO | WO 86/04293 A | 7/1986 |
| WO | WO 96/22171 A | 7/1996 |
| WO | WO 96/26051 A | 8/1996 |

* cited by examiner

MACHINE TOOL

CROSS-REFERENCE TO RELATED APPLICATION

This application claims priority to PCT Application PCT/EP00/02309 filed Mar. 15, 2000, which claims priority to German Application No. 19911411.0 filed Mar. 15, 1999.

FIELD OF THE INVENTION

The invention concerns a machine tool, for example a lathe.

BACKGROUND OF THE INVENTION

Machine tools such as lathes usually have a bed on which are arranged individual modules of the machine, for example one or more tool carrier systems, one or more workpiece carrier systems, measuring units, loading and unloading devices and so forth.

For that reason the bed must be designed to be as inherently strong and stable as possible as it is only in that way that it is possible to achieve high levels of machining accuracy on the workpieces produced on the machine tool.

In order to be able to displace the modules of the machine in the longitudinal direction of the bed, which is referred to generally and therefore also herein as the Z-direction, arranged on the bed are guide tracks on Which those modules of the machine run.

In this respect, different forms of bed are known, for example in the case of lathes the beds may be cradle beds, inclined beds, vertical beds and overhanging beds and so forth. The beds however generally stand flat on a base plate or on the foundation ground on which the machine tool is supported.

In that respect the different forms of bed serve on the one hand to achieve a good discharge flow of the cuttings and chips which are produced in the machining operation, while on the other hand serving to achieve the highest possible level of stability, in particular from dynamic points of view, for the bed.

A problem in that respect is also the supply of energy to the machine modules which are guided on the top side or at the front side of beds of that kind, the modules in turn having motors, for example for driven tools, for movement of the tool carrier unit, for example a tool turret, and so forth.

What is critical in that respect is in particular the energy supply to the machine modules which are disposed at a low level and which are below the machining position, as the energy feed means for same, which have to be flexible in design because of the longitudinal displaceability involved, are in the region into which the chips and turnings fall.

SUMMARY OF THE INVENTION

An object of the invention is to provide a machine tool which, in spite of the possibility of simple and inexpensive manufacture thereof, permits a highly variable layout and fitment of the machine tool with machine modules and which moreover in spite of a good discharge of chips and turnings permits a simple supply of energy with a low level of susceptibility to trouble, in particular to the lower machine modules.

A further object of the invention is to provide an improved machine tool which affords structural strength in particular in respect of its bed and which is of a rational design configuration adapted to afford versatility in terms of fitting equipment items thereto.

Still another object of the invention is to provide a machine tool having a bed of enhanced rigidity while not impeding the fitment of and movement of operating units thereon and the movement of supply lines and conduits for same.

Those objects are attained by the invention set forth herein. Advantageous embodiments are set forth in the appendant claims.

By virtue of the bed being stood up to form a portal bed, in particular on only two feet at the ends of the bed, all kinds of energy feed means can be passed in virtually any amount transversely beneath the bed and displaced in the longitudinal direction together with the machine modules which they supply. That avoids limitations as to whether and which machine modules are used on the lower part of the bed, therefore in particular beneath the machining position.

Hitherto standing the bed up to form a portal bed in that way was faced with the prejudice that a machine tool achieves correspondingly better machining results, the more stable that the bed and the substructure carrying the bed is, in particular in relation to vibration and oscillations. For that reason hitherto beds were generally supported over the full surface area or on a large number of contact points, in relation to the foundation ground.

By virtue of the fact that the support feet of the machine tool of the invention are only of very small height, just sufficient for the energy supply lines such as electrical cables, hydraulic conduits, pneumatic hoses etc to be passed through beneath the bed, it is possible on the one hand to achieve a bed cross-section which is of a great height and which thus enjoys a high level of stiffness in relation to flexing without on the other hand the machining position, for example the turning center of a lathe, being disposed at an excessively great height for the operator who stands in front of the machine, even if the machining position is in the upper heightwise region of the bed, in particular in the upper half thereof, because a lower tool support is provided in the lower region.

Because the portal bed is of an approximately rectangular cross-section, or at any event has outsides, in particular for example the top side and the front side, which are at a right angle relative to each other and which carry the individual guide tracks, machining of the bed can be implemented easily and inexpensively. By virtue of guide tracks which extend thereon exclusively in the Z-direction and by virtue of using identical guide tracks, it is possible on the one hand to achieve a further reduction in cost, while on the other hand the individual machine modules can be fitted on different guide tracks. For that reason all guide tracks in both transverse directions (X-direction and Y-direction) with respect to the direction of displacement of the machine modules, being therefore the Z-direction, are of a positively locking configuration, in particular of such a configuration as to engage behind their components sliding thereon.

In addition the portal bed has through openings which are continuous in the longitudinal direction and which are open on both sides and which can also serve for the passage therethrough of lines and conduits, for example energy supply conduits, from one end of the machine to the other. When the structure is made of plastic material or a concrete-plastic mix, the through openings generally comprise two or three mutually superposed circular through openings, while when the portal bed is made from cast steel the through openings remain between the surrounding, peripherally extending outer shell and the ribs formed in one piece therewith, generally therefore being two or three large hollow chambers. The cross-section of the portal bed is preferably between 1.5 and 3 times as high and in particular between 1.8 and 2.2 times as high as the depth of the portal bed and guides are preferably arranged only on the top side and the front side, more specifically with a pair of guides on the top side and two pairs of guides at the front side.

In a preferred embodiment the pairs of guides at the front side are at different guide track spacings, but the pairs are relatively close together one above the other.

In another preferred embodiment of this structure the spacing of the guide tracks within the pairs is identical and the spacing of the pairs relative to each other likewise, so that overall only identically spaced guides and preferably four guide tracks are arranged at the front side.

Preferably, no guide tracks are arranged at the underside, in order not to increase the necessary height of the feet of the bed.

At best a guide track could also be arranged at the front edge of the underside, whereby however a machine module would only slightly engage around the lower front edge of the bed. Machine modules guided completely along the underside, that is to say by means of guide tracks arranged at the front and rear edges of the underside, would result in an increase in the support height and would involve the disadvantages that this entails. Provided between the individual guide tracks, also extending in the longitudinal direction and in particular being continuous, are channel-shaped recesses in the surface of the portal bed, which serve to receive the ball rolling spindles for driving the machine modules in the longitudinal direction or other transmitting drive elements.

In order to protect the guide tracks from contamination, preferably telescopic covers are arranged in the longitudinal direction, which preferably always jointly cover a pair of guide tracks, that is to say for example the pair of guide tracks which is arranged on the top side.

In order to prevent chips and turnings from being squeezed in between two mutually adjoining mutually telescopic covers, intermediate covers are arranged between the individual covers which are arranged in superposed relationship in respect of height and which are each telescopic in themselves in the longitudinal direction. The intermediate covers are in particular fixedly mounted and are non-telescopic, while the telescopic guide cover which is disposed thereover and the guide cover which is arranged therebeneath engage the intermediate cover from two different sides. In this case the intermediate cover extends in an inclinedly downward position or even vertically in order to prevent the ingress of chips and turnings between the individual covers.

The bed feet are preferably not a component part of the bed but separate individual parts. The portal bed preferably stands on a base plate which is in the form of a welded structure and the bed feet are preferably also welded structures which are screwed on the base plate or which are formed in one piece together therewith. In that respect relative displacement of the bed with respect to the assembly carrying it, that is to say for example the base plate, by virtue of thermally induced expansion of the bed in the machining operation, must be possible, for example by virtue of suitable clearance in the screws.

Additional devices such as the required switch cabinets and energy supply devices such as hydraulic and pneumatic pumps and the like are preferably also disposed on such a base plate, behind the bed of the machine tool, and a loading and unloading system for the machine is also fixed either on the base plate or directly at the end to the machine bed. In that case the switch cabinets and energy supply devices can be positioned as closely as possible to the rear of the bed or can be at such a large spacing in relation thereto that a service passage or corridor is afforded therebetween, from which service personnel at the rear of the machine can carry out maintenance and repair operations or observe the machine while it is operating.

In that respect the additional devices, that is to say switch cabinets and energy supply devices, can preferably be mounted on the bed or the base plate by means of an auxiliary structure, which can be referred to as the switch cabinet frame structure, more specifically optionally in the position which is as close to the machine as possible or the position which is spaced therefrom in order to afford the service passage or corridor, depending on the respective ground floor area available at the user of the machine.

In all cases in that respect the machine is transported in the fully assembled condition, that is to say in the form which can be referred to as 'hook machine', in that the entire machine assembly can be lifted in its entirety by a crane hook, preferably however with the additional units in the position of being moved close to the bed, insofar as the bed with all machine modules and ancillary units thereon is lifted for example by a crane hook and the additional units are moved into the position of being spaced from the bed only after the machine has been set up at its position of use.

Furthermore, even when the switch cabinets which are generally arranged over the entire longitudinal extent of the machine are arranged close to the bed, there must still be sufficient space between the cabinets and the rear of the bed for energy supply lines and conduits there, for example trailing cable arrangements. Trailing cable arrangements which supply energy to the lower and upper tool modules respectively are arranged in particular at the height of the upper edge and the lower edge respectively of the portal bed.

Those trailing cable arrangements can without any problem supply energy in particular to a tool unit which is longitudinally guided on the top side of the portal bed and a tool unit which is guided on the lower pair of guides at the front side.

The chips and turnings produced are removed by means of a chip conveyor which is arranged at a suitable depth directly in front of the front side of the machine bed. For that purpose, when using a base plate, it has a bevelled upper front edge and the portal bed is mounted so far forwardly on the base plate that its front edge is already disposed above that bevel configuration of the base plate.

A workpiece unit in particular a headstock or a tailstock longitudinally guided on the upper pair of guides at the front side is therefore preferably so designed that it manages without any supply of energy, for example insofar as the longitudinal movement is produced by means of a mechanical component, for example a ball roll spindle, and the workpiece is held passively, for example in the case of a tailstock, by means of a spring biasing force in respect of the tailstock sleeve in relation to the tailstock housing. In that way, in the case of a machine module which is movable in the longitudinal direction, it is possible to avoid an energy supply means movable therewith, at the center of the height of the machine tool. A portal bed which is highly uniform in regard to its stability by virtue of its rectangular shape, with identical Z-guides extending in parallel relationship, can be used for different machine structures.

A preferred embodiment is in the form of a lathe in which in particular the headstock and possibly the additional tailstock is guided at the front side of the portal bed in the upper region while machine modules, generally tool slide systems, are guided in the lower region and on the top side. In that case, as viewed from the front side of the machine, there may even be two such units on each of the same guide tracks, that is to say to the right and to the left of the workpiece.

While in the case of the conventional design configuration in that case the spindle axis is directed in the Z-direction, it is also possible to adopt a transverse arrangement, that is to say for example in a vertical direction referred to as the X-direction, in particular if the headstock in that case is guided along the guide tracks at the top side of the portal bed.

An embodiment in the form of a milling machine with a tool mounting arrangement in the upper region of the front side of the portal bed is also possible, with milling units which are guided along the guide tracks at the top side. If in addition the unit carrying the workpiece is longitudinally guided in the lower region of the portal bed, the longitudinal guides of the upper region at the front side are additionally available for tool modules, measuring modules or the like. That also makes it possible for the machine to be in the form of a hybrid milling/turning machine, that is to say, both with tool modules which are pure milling modules and also with tool modules which correspond to those of a lathe, that is to say which carry a tool turret with turning blades and possibly additional driven tools.

Further objects, features and advantages of the invention will be apparent from the description hereinafter of preferred embodiments.

DESCRIPTION OF THE PREFERRED EMBODIMENTS

Figure 1A:
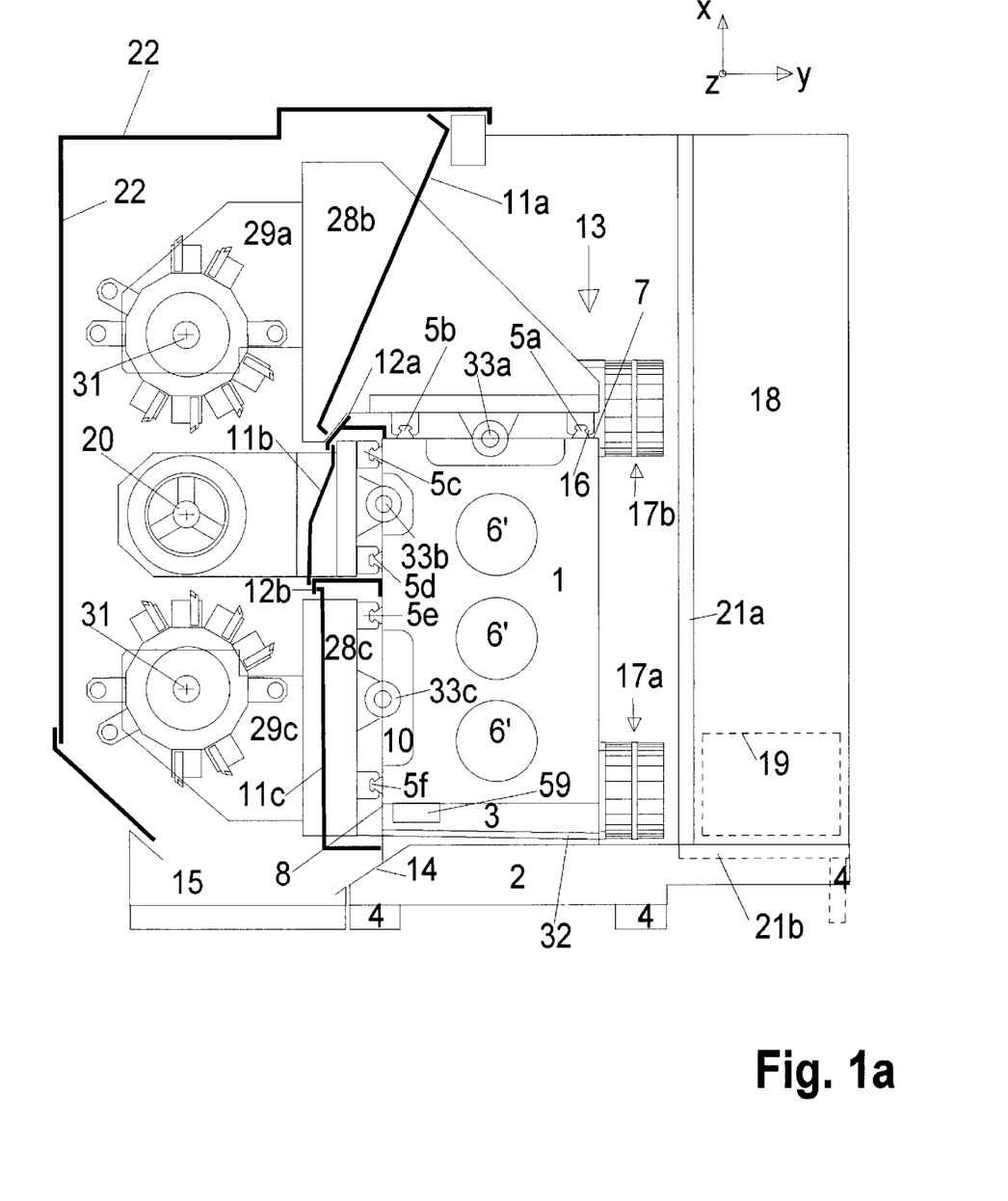
FIG. 1a is a side view of a lathe according to the invention with switch cabinets arranged closely to the bed of the machine.
Figure 1B:
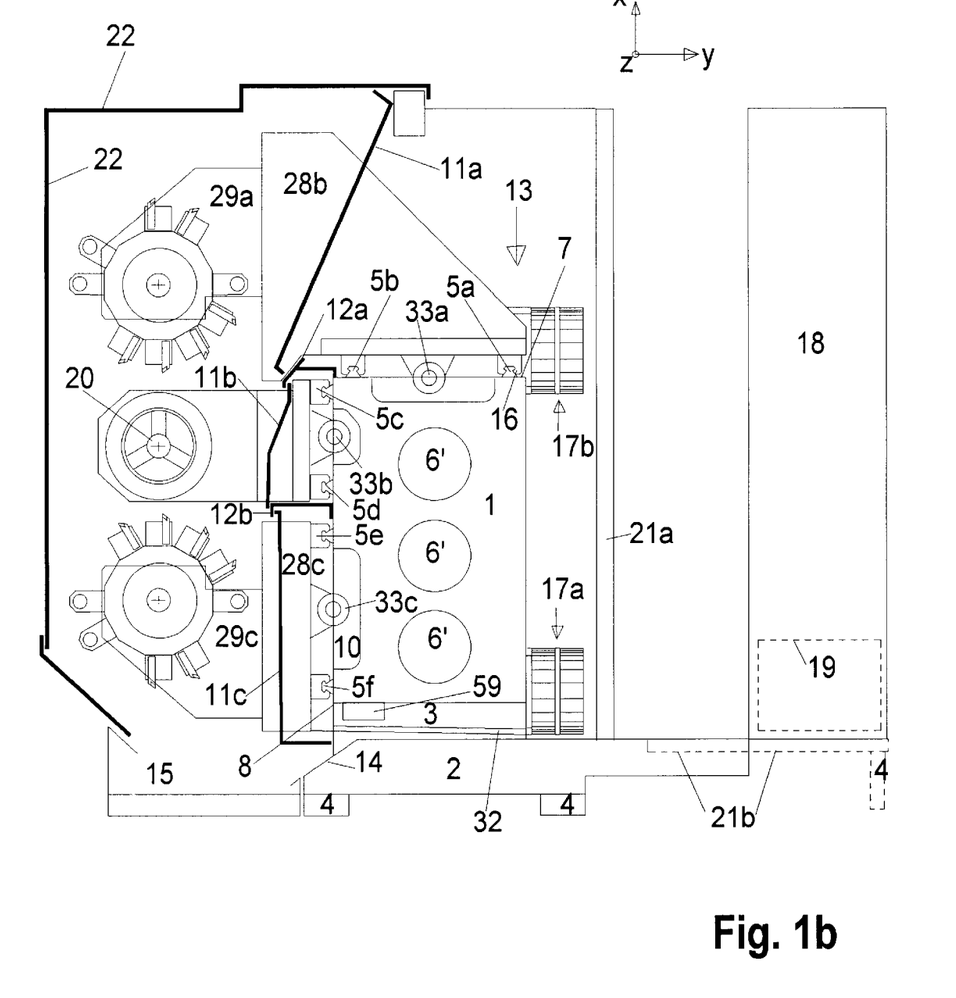
FIG. 1b is the same view of a similar lathe but with the switch cabinets at a spacing.

Referring firstly to FIGS. 1a and 1b, the actual machine tool in each thereof is the same, that is to say with the exception of the position of the switch cabinets 18 and the energy supply devices 19 which are arranged behind the rear side 13 of the bed.

Figure 2:
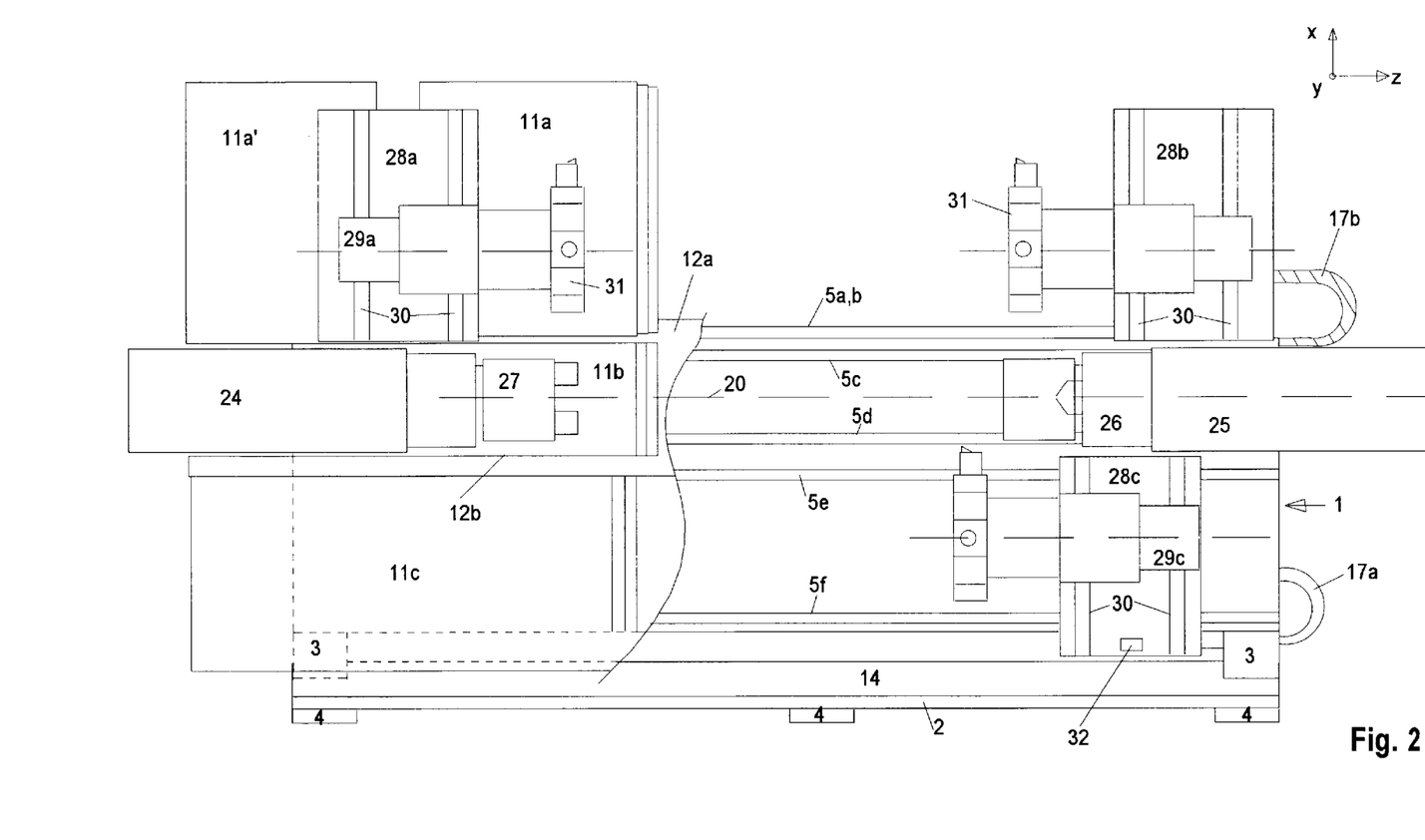
FIG. 2 is a front view of the lathe of FIG. 1 without switch cabinets and with guide cover members partially removed.

In particular the front view of FIG. 2 shows that the portal bed 1 is stood up relative to the foundation on which it stands, more specifically in this case a base plate 2, by means of two bed feet 3 which, as viewed in the Z-direction, are disposed under the two ends at the longitudinal sides of the portal bed 1, and preferably extend over the entire depth in the depthwise direction, being the Y-direction of the bed 1.

The portal bed 1 is a strong and stable beam with hollow spaces or cavities, in particular through openings as indicated at 6' in the longitudinal direction, and in the structure shown in FIGS. 1 and 2 comprises concrete or a plastic material-concrete mix.

Looking at FIGS. 1a and 1b arranged at the top side 7 and the front side 8 of the rectangular cross-section of the portal bed 1, which stands on edge, are guide tracks 5a through 5f, more specifically a first pair 5a, 5b at the top side, near the front edge and the rear edge of the top side 7, and four guide tracks 5c through 5f at the front side 8, wherein the uppermost ones are arranged near the upper edge and the lowermost ones are arranged near the lower edge.

The guide tracks are of a cross-sectional configuration such that components movably mounted thereon engage behind portions of the tracks in positively locking relationship therewith, the tracks being for example as shown of mushroom-shaped cross-section.

The spacing between the two central guide tracks 5d and 5e is less than between the upper and lower pairs of guide tracks, as between the central guides there only has to be space for arranging a fixedly mounted intermediate cover, as will be described in greater detail hereinafter.

It is however also possible to envisage spacing the guide tracks at the front side 8 with respectively equal spacings.

The through openings 6' are of circular cross-section and as shown three circular openings 6' are arranged in mutually superposed relationship in the vertical central plane of the bed 1 in such a way that the remaining thicknesses of material in relation to the top side, the underside and between the through openings 6' is approximately equal, and likewise in relation to the front side 8 and the rear side 13. The individual guide tracks 5a through 5f are each identical and likewise the guide shoes indicated at 16 in FIGS. 1a and 1b which run on the guide tracks. While the guide tracks extend over substantially the entire length in the Z-direction of the portal bed 1, namely over the entire intended range of movement of the machine modules which move thereon, each machine module generally has in the longitudinal direction a guide shoe 16 which runs on the corresponding guide track 5, only at the beginning and at the end of the machine module. In that case the guide tracks 5 and the guide shoes 16 which run thereon are generally in the form of roller guide shoes being adapted to engage behind the tracks in positively locking relationship in the other two directions in space, that is to say in the X-direction and the Y-direction, which affords the advantage that all longitudinal guides are of an identical configuration, irrespective of the direction in which the force of gravity acts in relation to the guide tracks 5.

Channel-shaped recesses 10 extending in the longitudinal direction are arranged between the guide tracks which are used in pairs, in the corresponding outward sides of the portal bed 1, in order there to afford space for the screwthreaded spindles 33a, b, c, by means of which the machine modules which run on the guides are driven in the Z-direction.

Trailing cable arrangements 17a, 17b, comprising a plurality of pivotally interconnected members constituting an elongate flexible chain-like duct with cables laid therein are arranged immediately behind the rear side 13 of the portal bed 1 in the upper and lower regions in order for the energy lines to follow the machine modules which are movable in the longitudinal direction. In this respect, of the trailing cable arrangements which comprise individual members and which are curved in a U-shape, for example in the case of the upper arrangement 17b, the one free end is associated with the portal bed 1 in the proximity of the upper edge thereof, whereas the other end is associated with the upper tool support. A separate trailing cable arrangement is associated with each individual tool unit.

In the case of the lower trailing cable arrangement 17a the association of the lower end with the lower tool unit is at a height which is below the underside of the portal bed 1 so that the energy lines which go on from that lower end of the trailing cable arrangement 17a can then be passed between the underside of the portal bed 1 and the foundation surface, in this case therefore the base plate 2, that is to say in the heightwise region of the bed feet, to the front side 8 and the lower, longitudinally movable machine unit which is displaced there.

The machine shown in FIGS. 1a, 1b and 2 has machine modules as follows: As the front view in FIG. 2 shows, a tailstock 25 is movable in the Z-direction and runs on the two upper guide tracks 5c and 5d of the front side 8. The tailstock 25 has a tailstock housing carrying a tailstock sleeve 26 which is directed towards the oppositely disposed headstock 24. The tailstock sleeve 26 is spring-loaded in relation to the tailstock housing 25 so that the tailstock center can be pushed into the tailstock 25 only by actively pressing a workpiece there against.

The headstock 24 in which the workpiece (not shown) can be held and driven rotationally on the turning center 20 by means of a chuck 27 can either be fixedly arranged on the portal bed 1 or can be guided slidably along the guide tracks 5c, 5d.

Guided on the lower two guide tracks 5e, 5f at the front side 8 of the portal bed 1 is a lower tool support, shown in the form of a longitudinal slide or saddle 28c having transverse guides 30 on which a transverse slide 29c is displaceable in the X-direction. The slide 29c carries a tool turret 31 whose tools can act on the workpiece.

Two tool units are longitudinally slidably arranged on the guide tracks 5a, 5b at the top side 7 of the portal bed 1. The tool units each have a longitudinal slide or saddle 28a, 28b, on the transverse guides 30 of which is displaceable a respective transverse slide 29a, 29b which in turn carries a respective tool turret 31. The tool turrets 31 are respectively directed in opposite relationship to each other in order to be able to operate on the same workpiece from both sides and thus as far as possible at the same time.

In the present case shown in FIGS. 1 and 2 the axes of rotation of the tool turrets 31 of all tool units are parallel to the Z-direction.

As shown in FIGS. 1a and 1b, various covers are provided on the machine tool: on the one hand a working space cover 22 which covers the entire working space of the machine at the front side (at the left in FIG. 1a), the top side and the underside and which can be opened (not shown) in the longitudinal direction, selectively only at the front side or only at the top side or at both. That working space cover 22 is completely omitted in the front view in FIG. 2.

The working space is delimited at the rear side at the rear side at the right in FIG. 1a by guide covers 11a, 11b, 11c which are guided there and which are arranged in front of the guide tracks 5 and thus the portal bed 1 in order to keep contamination which occurs in the working space, away from the guide tracks 5. As shown only in the left-hand half of the machine in the front view of FIG. 2, these guide covers 11a, b, c are each telescopic in the longitudinal direction and are fixed to the respective longitudinal slide or saddle in order always to cover the entire length of the guide tracks, depending on the respective position of the slide or saddle. Those guide covers 11a, b, c do not overlap directly in the vertical direction, but only indirectly by virtue of intermediate covers indicated at 12a and 12b in for example FIG. 1a, which are arranged therebetween and which are not telescopic but which are fixedly mounted, as can best be seen from FIGS. 1a and 1b.

The intermediate covers 12a, 12b are designed to extend inclinedly forwardly and downwardly or are completely vertical, like also the telescopic guide covers 11a, 11b, 11c in order to carry away downwardly any fouling which occurs thereon. The guide cover which is higher in each case with respect to a respective intermediate cover 12, for example the guide cover 11a, ends with its lower end in front of the respective intermediate cover, for example the intermediate cover 12a, while the telescopic cover 11b which is disposed therebeneath ends with its upper end behind that intermediate cover 12a. That avoids the ingress of contamination and fouling, in particular chips and turnings, between two directly oppositely moving telescopic guide covers, which sometimes results in such telescopic covers becoming jammed.

In this arrangement the upper intermediate cover 12a is arranged to extend inclinedly downwardly towards the left in FIG. 1a and is mounted to the upper longitudinal edge of the portal bed 1.

The lower intermediate cover 12b which is mounted between the two pairs of guides 5c, 5d and 5e, 5f is in the form of a U-shaped, downwardly open angle profile member screwed with the one freely ending limb to the front side 8 of the portal bed 1, while the front, freely downwardly facing limb serves as an actual intermediate cover.

The portal bed 1 is arranged by means of the bed feet 3 on a base plate 2 which in turn stands by means of base plate feet 4 on the ground beneath it, and can be set exactly horizontally. The front upper edge of the base plate 2, at the left in FIG. 1a, has a forwardly dropping bevel 14 and the portal bed 1 stands so far forwardly on the base plate 2 that the front side 8 thereof is already disposed above the bevel 14. In that way it is made easier for chips and turnings to drop, also along the guide covers 11a through 11b, downwardly directly into the chip conveyor 15 which is arranged directly in front of the base plate, while the bevel 14 also carries the chips and turnings away into the chip conveyor 15 which extends in the longitudinal direction (being omitted for the sake of simplicity of the drawing in FIG. 2).

The side views in FIGS. 1a and 1b differ in regard to the positioning of the switch cabinets 18 and the energy supply devices 19 such as for example hydraulic pumps with respect to the portal bed 1 at the rear thereof. While in FIG. 1a those auxiliary devices are positioned as closely as possible to the rear of the portal bed 1, more specifically at the vertical frame 21a of a switch cabinet frame structure 21, the frame 21a projecting upwardly immediately behind the trailing cable arrangements 17a, 17b, with the auxiliary devices being supported on the horizontal frame 21b, in FIG. 1b those auxiliary devices are spaced in relation thereto horizontally in the Y-direction. In this case for example together with telescopic parts of the horizontal frame 21b the auxiliary devices are displaced rearwardly, which horizontal frame 21b can be part of the base plate 2. In the spaced position of the auxiliary devices as shown in FIG. 1b however the auxiliary devices can also be arranged on a separate base member which is to be positioned behind the rear edge of the base plate 2, or on individual feet.

In particular the machine is supplied in the compact condition as shown in FIG. 1a, more specifically with the switch cabinet 18 fully wired up and with the energy supply devices 19 connected. To achieve the spaced position as shown in FIG. 1b the length of the lines and conduits connecting the auxiliary devices to the actual machine tool must be sufficiently great to be able to perform the spacing movement in the Y-direction. In the compact condition of FIG. 1a, excess lengths of the energy feed lines and conduits are accommodated in a suitable cavity within the switch cabinet frame structure 21 and/or in the intermediate space between the portal bed 1 and the switch cabinet frame structure 21.

The spaced condition in FIG. 1b serves to provide a service passage or corridor 34 between the energy supply devices and the rear side of the actual machine tool, insofar as mounted therebetween is a catwalk 23 consisting of grid plates and the like, more specifically preferably raised with respect to the level of the base plate in order to allow the operator to view into the machine tool, preferably above the portal bed 1, at the correct viewing height.

For that purpose, separating plates are arranged in the vertical plane of the vertical frame 21a of the switch cabinet frame structure in order to prevent a person standing on the catwalk 23 from reaching into the machine while the machine is operating. The separating plates can preferably be transparent and are releasable or can be pivoted open, for example by means of door fittings.

Figure 3:
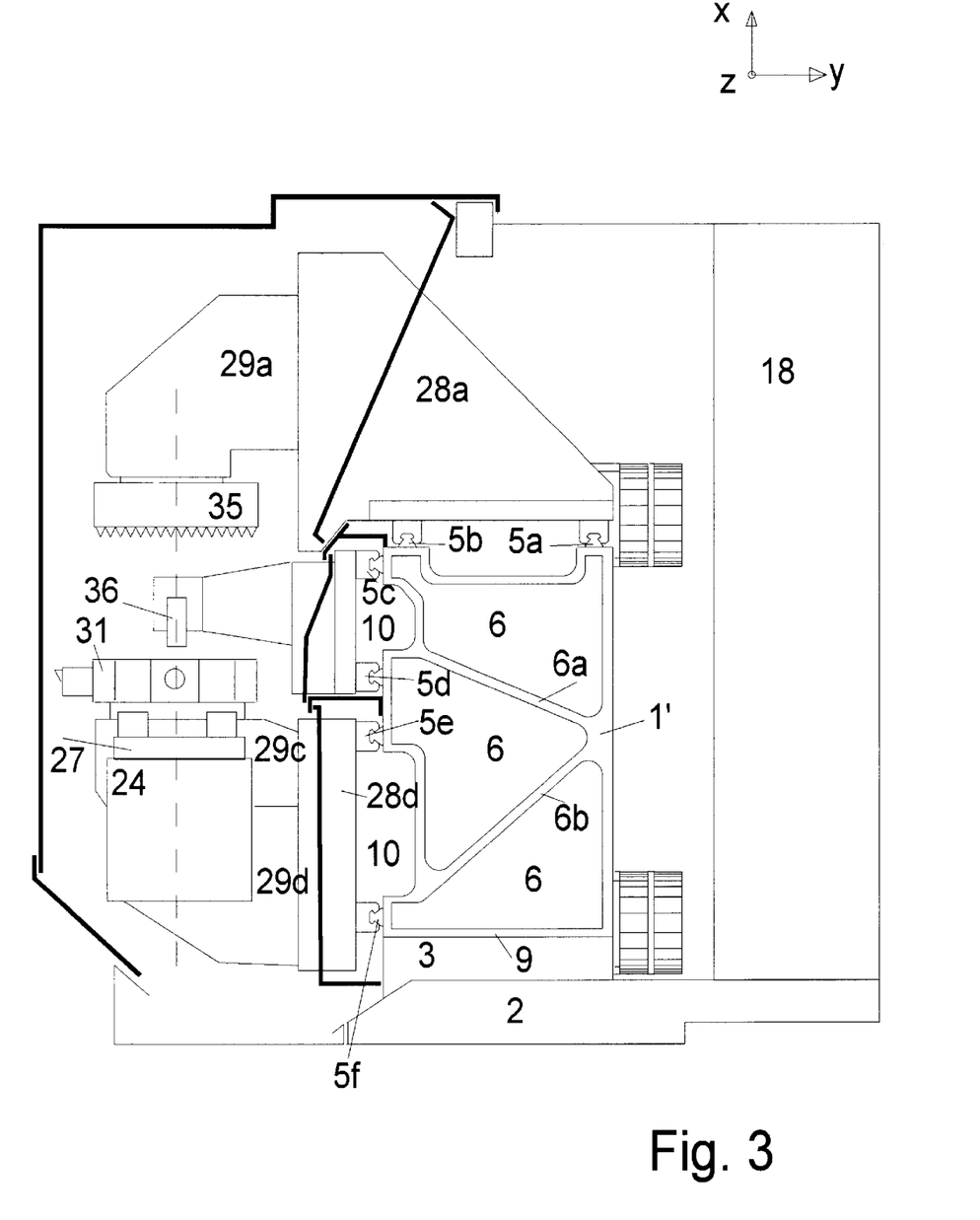
FIG. 3 is a side view of a machine tool of another configuration.

The machine tool shown in FIG. 3 differs from that shown in FIGS. 1a, 1b and 2 on the one hand in regard to the manner of manufacture of the portal bed 1 and on the other hand in regard to the machine modules which are mounted on the portal bed 1.

In contrast to the portal bed 1 in FIG. 1a which comprises concrete or a concrete-plastic mix and which is of correspondingly great wall thicknesses, the portal bed 1' in FIG. 3 comprises cast metal and is accordingly of very much smaller wall thicknesses. To stiffen the portal bed and to provide for vibration damping, the portal bed 1' has two transverse ribs 6a and 6b, besides the walls which extend around it on the exterior. The ribs 6a and 6b extend from a point at the middle of the height of the rear side of the portal bed 1' inclinedly upwardly and downwardly, and meet the wall of the front side in the region of the recesses 10 between the uppermost and lowermost pairs of guide tracks on the front side.

The transverse ribs 6a, 6b are formed in one piece with the external peripheral walls and like same extend in the longitudinal direction, being the Z-direction, of the portal bed 1, so that the three, irregularly shaped through openings 6 which are provided between the ribs and the outside walls are open at the ends.

In FIG. 3 a combined turning-milling machine is mounted on the portal bed 1'.

The headstock 24 which carries the chuck 27 for the workpiece (not shown) is however oriented vertically and is disposed on the vertically displaceable transverse slide 29d of a longitudinal slide or saddle 28d which is displaceable on the lower pair of guide tracks 5e, 5f at the front side of the portal bed 1' in the longitudinal direction of the bed, being the Z-direction.

As shown in FIG. 3 a workpiece held in that way can be machined either by a tool turret 31 equipped with turning tools or with driven tools and which is arranged with an axis of rotation parallel to the headstock 24, that is to say in particular a vertical axis of rotation, on a transverse slide 29c which in turn is movable vertically on a longitudinal slide or saddle 28c which runs on the same guide tracks 5e, 5f as the headstock 24.

Arranged on the guide tracks 5a, 5b at the top side 7 of the portal bed 1' by way of the longitudinal slide or saddle 28a and the transverse slide 29a which is displaceable thereon in the vertical direction is a milling head 35 whose axis of rotation is also vertical and which can be moved downwardly to such an extent that it can act on a workpiece held in the headstock 24.

In this arrangement the headstock 24 and the associated chuck 27 are preferably capable of assuming a defined rotational position (the embodied C-axis). In addition, arranged on the upper pair of guide tracks 5c, 5d which are in the upper region at the front side 8 of the portal bed 1' is a measuring head 36 mounted on a transverse slide 29e which in turn is displaceable vertically on a longitudinal slide or saddle 28e.

Instead of the machine configuration shown in FIG. 3, other assemblies are also possible. If for example the slide system for the measuring head 36 were not present, then the longitudinal guide 5a at the top side together with the uppermost longitudinal guide 5c at the lower side could be used for the upper slide system carrying the milling head 35, as a support arrangement, and similarly for the slide system of the headstock 24 and/or the tool turret 31 in FIG. 3 the guide tracks 5d and 5f, whereby for both slide systems the greatest possible relative spacing of the guide tracks which are used for them would be selected. In a corresponding fashion the guide covers and the intermediate covers thereof are then also to be arranged differently.

Figure 4:
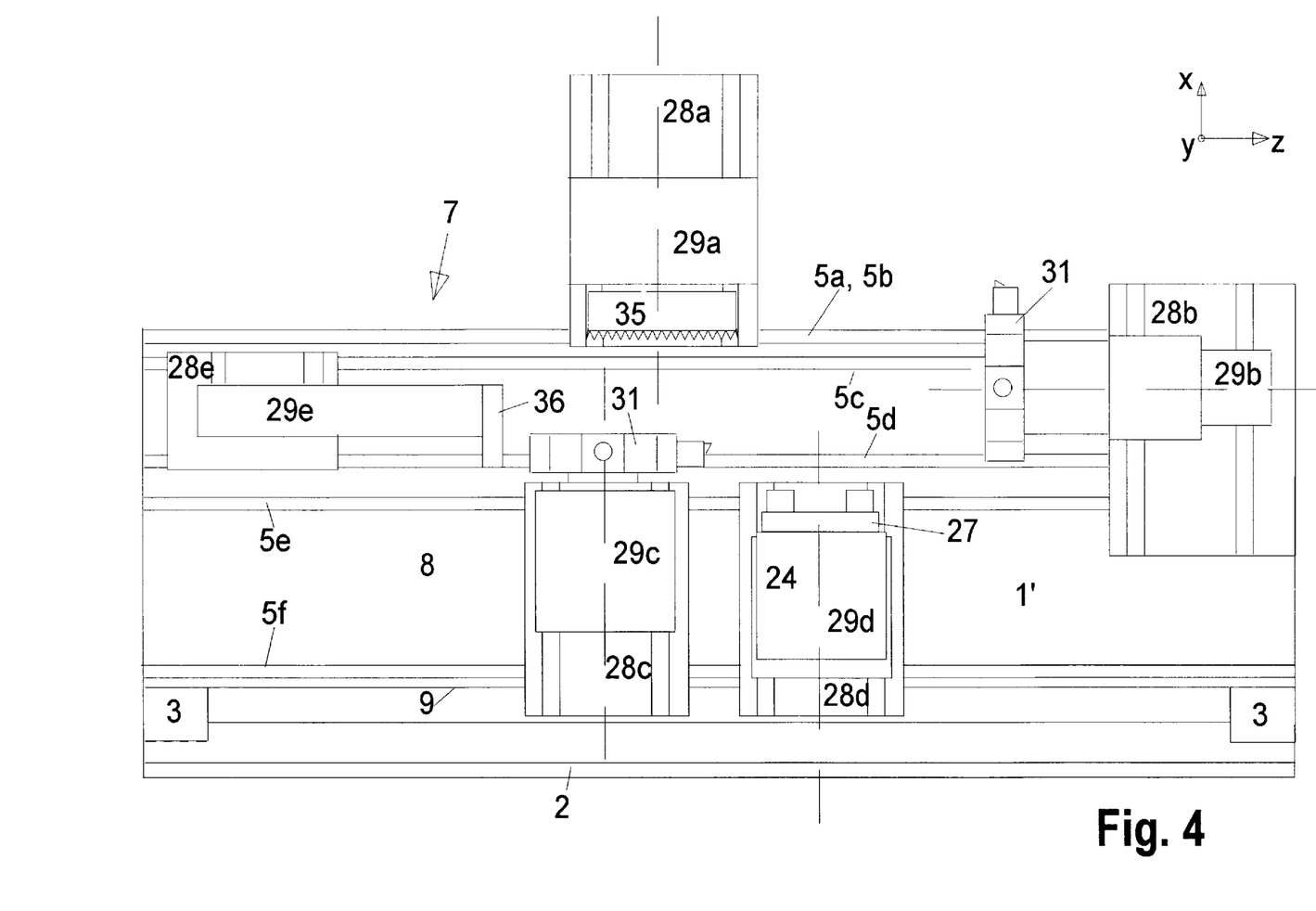
FIG. 4 is a front view of a machine tool which is supplemented in comparison with the view shown in FIG. 3.

FIG. 4 is a front view of the machine tool shown in FIG. 3, but with an expanded machine structure. The embodiment shown in FIG. 4 additionally has a further slide system comprising a longitudinal slide or saddle 28b and a transverse slide 29b which run on the upper pair of guide tracks 5c, 5d at the front side 8, and also carry a tool turret 31' with turning tools and/or driven tools, with the axis of rotation of the tool turret 31' extending horizontally.

That additional slide system could equally also be arranged on the upper guide tracks 5a, 5b of the upper side 7, or an additional tool system could also run there.

While the invention has been described with a certain degree of particularly, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

| List of references | |
|---|---|
| 1 | portal bed |
| 2 | base plate |
| 3 | bed feet |
| 4 | base plate feet |
| 5 | guide frame |
| 6, 6' | through opening |
| 7 | top side |
| 8 | front side |
| 9 | lower side |
| 10 | recesses |
| 11a, 11b, 11c | guide cover |
| 12a, 12b | intermediate cover |
| 13 | rear side |
| 14 | bevel |
| 15 | chip conveyor |
| 16 | guide shoe |
| 17 | trailing cable arrangement |
| 18 | switch cabinets |
| 19 | energy supply devices |
| 20 | turning center |
| 21 | switch cabinet frame structures |
| 22 | working space cover |

-continued

List of references

| | |
|---|---|
| 23 | running limb |
| 24 | headstock |
| 25 | tailstock |
| 26 | tailstock sleeve |
| 27 | chuck |
| 28a, 28b | upper longitudinal rail |
| 28c | lower longitudinal rail |
| 29a, 29b | upper transverse rail |
| 29c | lower transverse rail |
| 30 | transverse guides |
| 31 | tool turret |
| 32 | energy line |
| 33 | screwthreaded spindle |
| 34 | service corridor |

What is claimed is:

1. A machine tool comprising:
a bed in the form of a portal bed having front and rear sides, top and bottom edges and an underside;
machine modules;
at least one pair of guide tracks on said portal bed for carrying said machine modules;
at least one bed foot on which said portal bed rests;
at least one guide cover being telescopic in a Z-direction and having an upper and a lower end for covering a respective pair of said guide tracks and in an extended condition together with a corresponding machine module over the entire length of said portal bed; and
at least one intermediate fixed cover arranged vertically in a region between said at least one guide cover disposed thereabove and said at least one guide cover disposed therebeneath, and said at least one guide cover being arranged in substantially mutually superposed relationship and not directly overlapping in respect of height but indirectly by means of said intermediate fixed covers.

2. A machine tool as set forth in claim 1 including at least two bed feet supporting said portal bed and spaced in a longitudinal direction of said portal bed in a Z-direction.

3. A machine tool as set forth in claim 1 wherein said at least one bed foot is arranged at said front and rear ends of said portal bed in a Z-direction.

4. A machine tool as set forth in claim 1 wherein there is a space under said portal bed between said at least one bed foot and said space is freely accessible transversely with respect to a Z-direction.

5. A machine tool as set forth in claim 1 wherein said machine modules include tool slide systems, a headstock and a tailstock and are retained on said at least one pair of guide tracks.

6. A machine tool as set forth in claim 1 wherein said machine modules include tool slide systems, a headstock and a tailstock and are retained on said at least one pair of guide tracks displaceably in a Z-direction.

7. A machine tool as set forth in claim 1 wherein said portal bed has said at least one pair of guide tracks extending exclusively in a Z-direction.

8. A machine tool as set forth in claim 1 wherein said portal bed transversely with respect to a Z-direction is of a rectangular cross-section.

9. A machine tool as set forth in claim 1 wherein said portal bed is stable in itself and is dimensioned to be self-supporting even when equipped with said machine modules.

10. A machine tool as set forth in claim 1 wherein said portal bed includes at least one material from the group consisting of plastic material, concrete and a mixture of plastic material and concrete.

11. A machine tool as set forth in claim 1 wherein said portal bed includes cast steel.

12. A machine tool as set forth in claim 1 wherein said portal bed has at least two through-openings extending therethrough in a Z-direction.

13. A machine tool as set forth in claim 12 wherein said through-openings serve to pass energy supply lines therethrough in a longitudinal direction of said portal bed.

14. A machine tool as set forth in claim 12 wherein said portal bed includes at least one material selected from the group consisting of plastic material and concrete, and said at least two through-openings are circular in mutually superposed relationship.

15. A machine tool as set forth in claim 14 wherein said portal bed has three said through-openings.

16. A machine tool as set forth in claim 1 wherein the cross-section of said portal bed is of a height which corresponds to between 1.5 times and 3 times the depth of said portal bed.

17. A machine tool as set forth in claim 1 wherein the cross-section of the said portal bed is of a height which corresponds to between 1.8 times and 2.2 times the depth of said portal bed.

18. A machine tool as set forth in claim 1 wherein all of said at least one guide track on said portal bed extending in a Z-direction are identical guide tracks.

19. A machine tool as set forth in claim 18 wherein all of said at least one pair of guide tracks extend over an entire length of said portal bed.

20. A machine tool as set forth in claim 1 wherein said portal bed has a top side and a front side and includes at least one guide track extending in a longitudinal direction at least on its top side and on its front side.

21. A machine tool as set forth in claim 1 wherein said at least one bed foot is of a smaller height than said portal bed itself.

22. A machine tool as set forth in claim 21 wherein an opening is formed between said bed feet and the top of said base plate for passing energy supply lines through between said rear end and said front end of said portal bed.

23. A machine tool as set forth in claim 1 wherein said at least one bed foot is between 10 and 30 cm in height.

24. A machine tool as set forth in claim 1 wherein said at least one bed foot is between 15 and 20 cm in height.

25. A machine tool as set forth in claim 1 wherein said top side of said portal bed has front and rear ends and includes on said top side first and second guide tracks which extend in a longitudinal direction and which are arranged near the front and rear ends of said top side.

26. A machine tool as set forth in claim 1 wherein said portal bed front side has at least three guide tracks having upper and lower portions and extending in a longitudinal direction, the uppermost and the lowermost portions of said at least three guide tracks at said front side being arranged near said portal bed top and lower edges respectively of said portal bed.

27. A machine tool as set forth in claim 26 wherein said front side has four said guide track.

28. A machine tool as set forth in claim 1 wherein said portal bed underside is devoid of any guide tracks.

29. A machine tool as set forth in claim 1 wherein said portal bed has said at least one pair of guide tracks at one of its sides and disposed between the guide tracks, viewed from each edge of the portal bed, are channel-shaped recesses in the surface of the portal bed, and further including drive spindles being arranged in the channel-shaped recesses for the drive of said machine modules which are displaceable in a Z-direction along said at least one pair of guide tracks.

30. A machine tool as set forth in claim 29 further including first through fourth tracks and recesses between the first and second and the third and fourth guide tracks.

31. A machine tool as set forth in claim 1 wherein a guide cover arranged above an intermediate cover ends on the front side of the immediate cover and a guide cover which is therebeneath ends with its said upper end at said rear end of said intermediate fixed cover.

32. A machine tool as set forth in claim 1 wherein said intermediate covers are arranged to face inclinedly forwardly and downwardly in a region between said at least one guide cover disposed thereabove and said at least one guide cover disposed therebeneath.

33. A machine tool as set forth in claim 1 wherein said portal bed is in one piece and said at least one pair of guide track is screwed on said portal bed.

34. A machine tool as set forth in claim 1 wherein said at least one pair guide tracks are guide cross-sections which are provided with engagement therebehind in positively locking relationship in both transverse directions with respect to a Z-direction.

35. A machine tool as set forth in claim 34 wherein said at least one pair of guide tracks is of a C-shape in cross-section.

36. A machine tool as set forth in claim 1 including a base plate on which said portal bed stands by means of said at least one bed foot, and carried on said base plate are switch cabinets, energy supply devices such as hydraulic and pneumatic pumps and an automatic loading and unloading system for workpieces and/or tools.

37. A machine tool as set forth in claim 36 wherein said automatic loading and unloading system is fixed directly to said portal bed.

38. A machine tool as set forth in claim 36 including base plate feet on which said base plate stands on a foundation ground.

39. A machine tool as set forth in claim 36 wherein said at least one bed foot is formed in one piece together with said base plate.

40. A machine tool as set forth in claim 36 wherein fixing of said portal bed with respect to the bed feet base permits relative displacements in a Z-direction and in the transverse direction which is horizontal in relation thereto (the Y-direction).

41. A machine tool as set forth in claim 36 wherein said portal bed has a top side and an underside and is arranged with at least one of its top side and its underside parallel to said base plate and is arranged to stand upright.

42. A machine tool as set forth in claim 36 wherein said base plate has a front edge having a bevel forwardly and downwardly and said portal bed is so positioned on said base plate that the front side thereof projects over the bevel.

43. A machine tool as set forth in claim 36 including a chip conveyor arranged immediately in front of said base plate.

44. A machine tool as set forth in claim 36 wherein said switch cabinets and energy supply devices as well as further auxiliary units are arranged on said base plate spaced in relation to the rear side of said portal bed to such an extent that it is possible for an operator to pass therebetween while said machine tool is in operation.

45. A machine tool as set forth in claim 1 wherein said at least one bed foot is a separate components.

46. A machine tool as set forth in claim 1 wherein said machine modules are guided along said at least one pair of guide tracks extending in a Z-direction by means of guide shoes which embrace said at least one pair of guide track in positively locking relationship.

47. A machine tool as set forth in claim 46 including first and second guide shoes per said at least one pair of guide track and said machine module.

48. A machine tool as set forth in claim 1 wherein said portal bed has a rear side, and including arranged along the rear side of said portal bed at least one trailing cable arrangement for tracking displacement of cables in a Z-direction, which arrangement has first and second free ends which face in the Z-direction and of which the one is arranged fixedly with respect to said portal bed and the other is arranged fixedly with respect to said machine module to be supplied.

49. A machine tool as set forth in claim 48 wherein a trailing cable arrangement is arranged so far downwardly that a free end which is here associated with said machine module is arranged beneath said underside of said portal bed and more particularly at the height of the bed feet and the other feet end is arranged in the lower region of said portal bed and a machine module guided on the lowermost two guide tracks of the front side is supplied with energy by way of said at least one cable which is guided in said trailing cable arrangement, wherein said at least one cable is passed through under said underside of said portal bed.

50. A machine tool as set forth in claim 1 wherein said portal bed has an upper region and arranged in the upper region of said portal bed is a trailing cable arrangement having a free end associated with said machine module and arranged above the top side of said portal bed.

51. A machine tool as set forth in claim 1 wherein said machine tool is a lathe.

52. A machine tool as set forth in claim 1 wherein said machine tool is a lathe and has a tailstock driven by means of a mechanical member in a Z-direction along the longitudinal guides carrying it and having a tailstock sleeve biased towards a tailstock housing by means of a spring, and wherein moreover the tailstock does not have any further energy supply.

* * * * *